No. 726,048. PATENTED APR. 21, 1903.
J. GRANGER.
GATE.
APPLICATION FILED DEC. 30, 1902.
NO MODEL. 2 SHEETS—SHEET 1.
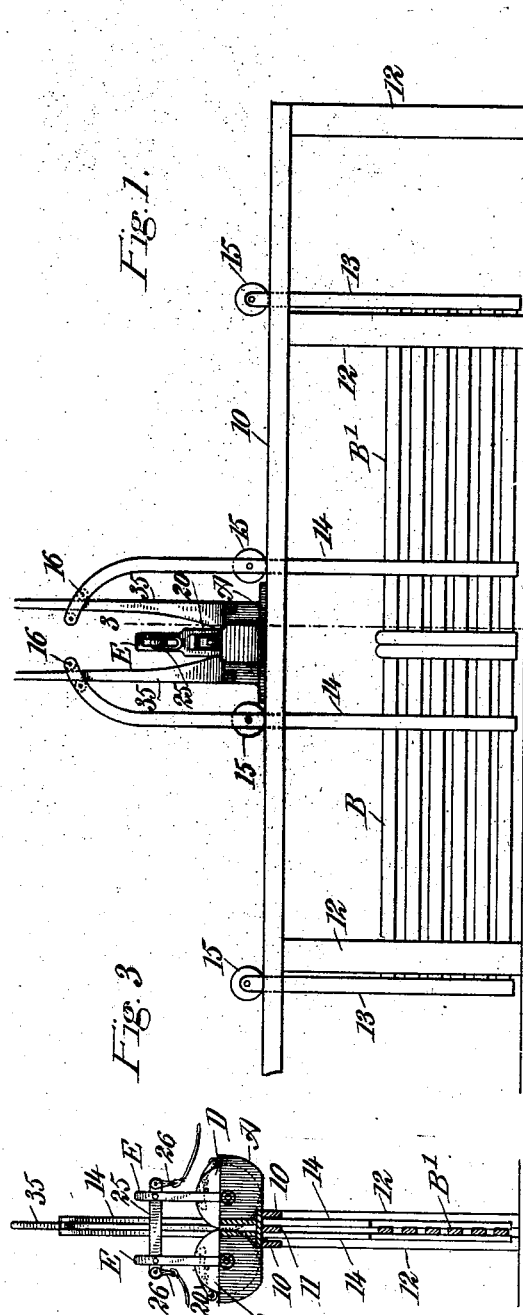
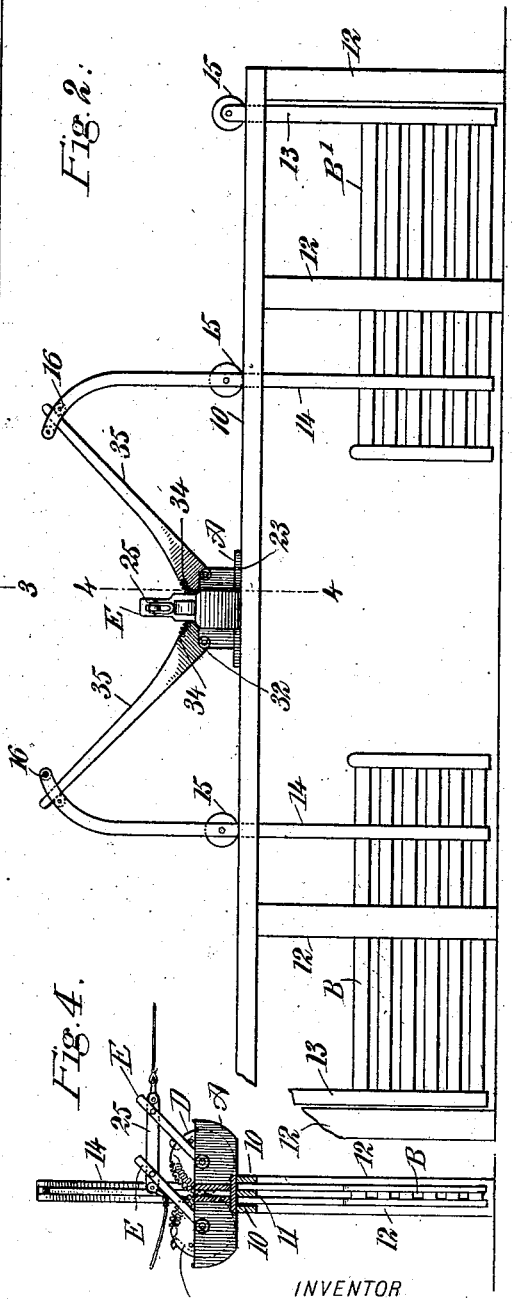
WITNESSES:
INVENTOR
John Granger
BY Munn & Co
ATTORNEYS.

No. 726,048. PATENTED APR. 21, 1903.
J. GRANGER.
GATE.
APPLICATION FILED DEC. 30, 1902.
NO MODEL. 2 SHEETS—SHEET 2.
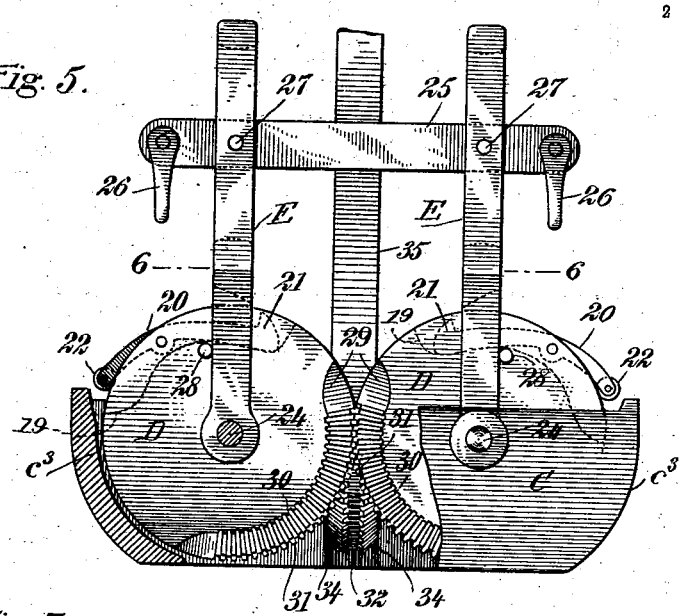
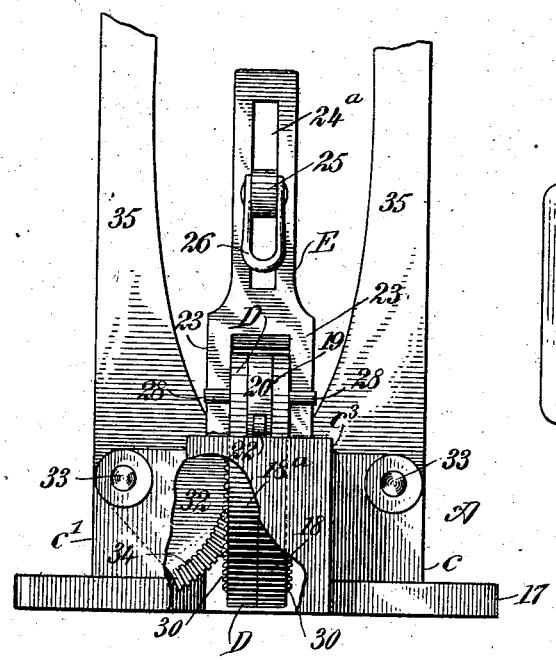
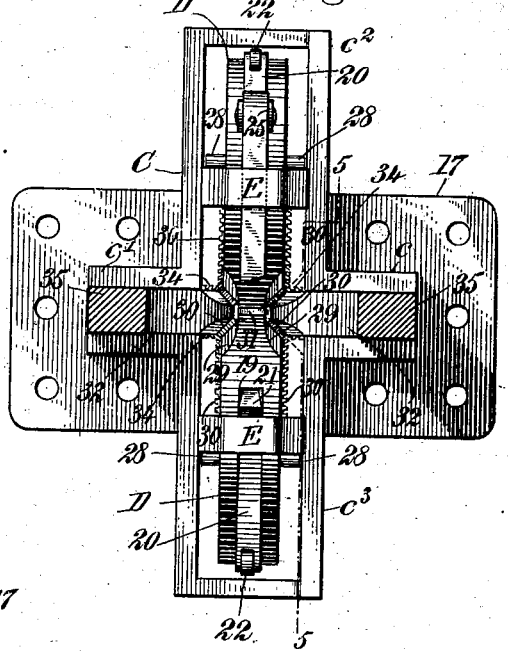
WITNESSES:
INVENTOR
John Granger
BY
ATTORNEYS.

UNITED STATES PATENT OFFICE.

JOHN GRANGER, OF SPRINGER, TERRITORY OF NEW MEXICO, ASSIGNOR TO HIMSELF AND JOHN SUTHERLAND, OF SPRINGER, TERRITORY OF NEW MEXICO.

GATE.

SPECIFICATION forming part of Letters Patent No. 726,048, dated April 21, 1903.

Application filed December 30, 1902. Serial No. 137,138. (No model.)

*To all whom it may concern:*

Be it known that I, JOHN GRANGER, a citizen of the United States, and a resident of Springer, in the county of Colfax and Territory of New Mexico, have invented a new and Improved Gate, of which the following is a full, clear, and exact description.

My invention relates to an improvement in gates, particularly farm-gates; and the purpose of the invention is to provide a structure wherein two gates are mounted upon roller-bearings to slide to and from each other and to provide, further, a simple and economic mechanism adapted for attachment to the supporting-frame of the gates, so connected with said gates that persons riding may, without dismounting, open the gates upon approaching them and close the gates after passing through the space between them, the opening and closing operations being accomplished by a simple downward pull upon one or the other end of an actuating-lever, which sets in operation a train of gearing connected with the lever and with the hanging supports of the gate.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a front elevation of the gates closed. Fig. 2 is a similar view of the gates open. Fig. 3 is a vertical transverse section taken practically on the line 3 3 of Fig. 1. Fig. 4 is a vertical transverse section taken practically on the line 4 4 of Fig. 2. Fig. 5 is an enlarged sectional elevation of the operating mechanism of the gate, taken on the line 5 5 of Fig. 6. Fig. 6 is a sectional plan view of the operating mechanism, the section being taken practically on the line 6 6 of Fig. 5; and Fig. 7 is a sectional end elevation of the operating mechanism.

A represents a frame for two gates B and B', adapted to have sliding movement to and from each other, the said gates being suspended from said frame. The frame A consists of upper horizontal side beams 10, together with an intermediate beam 11 and standards 12, which extend from the ground up into the spaces between the side and intermediate beams 10 and 11, to which beams the upper ends of the standards 12 are secured in any suitable or approved manner, and the gates B and B' are adapted to slide in the spaces between the standards 12.

The gates B and B' are provided with uprights 13, secured to their sides at their outer or rear ends, and these uprights 13 extend up into the spaces between the upper side rails or beams 10 and the upper intermediate rail or beam 11 of the supporting-frame A. Adjacent to the inner ends of the said gates B and B' other uprights 14 are secured to the sides of the gate, extending in like manner up through the spaces between the upper members 10 and 11 of the frame; but the uprights 14 from the inner portions of the gates are carried some distance above the said rails 10 and 11 of the frame A, and the upper ends of the longer or inner uprights 14 are curved in the direction of each other, as is particularly shown in Figs. 1 and 2. Rollers 15 are mounted to turn between the uprights 13 and the uprights 14, which rollers 15 travel upon the central upper beam 11 of the said frame A and serve to support the gates in position and admit of the said gates being readily moved to and from each other, while at the upper or curved ends of the inner uprights 14 two adjacent friction-rollers 16 are mounted to turn, as is also shown in Figs. 1 and 2, a space being between the said rollers of the said uprights for a purpose to be hereinafter described.

The operating mechanism for the gates is supported upon the upper beams or rails 10 and 11 at the central portion of the said frame A or just over the meeting portions of the gates B and B' when said gates are closed. This mechanism is constructed as is best shown in Figs. 5, 6, and 7 and consists of the following parts, namely: A frame C, which is cruciform, comprising side members $c$ and $c'$, extending in opposite directions, and end members $c^2$ and $c^3$, which end members are usually longer than the side members $c$ and $c'$. The said frame constructed as stated is provided with a base 17, which base is adapted to be secured by screws or otherwise upon the upper portion of the supporting-frame for the gates. In each end section $c^2$ and $c^3$ a wheel D is mounted to turn upon suitable pivots 24, and it may be stated at this point that the end portions of the end members $c^2$ and $c^3$ of the frame C are more or less concaved at their inner faces, as is shown in Fig. 5. The wheels D are preferably made of metal, although other material may be employed, and said wheels are also preferably made, as is illustrated in Fig. 7, in two sections 18 and $18^a$, suitably connected by rivets or otherwise. In each portion of each wheel D a peripheral pocket 19 is produced, and in each of said pockets a pawl 20 is fulcrumed, usually nearer its outer than its inner end. These pawls are more or less curved, their upper edges being convexed and their lower edges concaved. Each pawl 20 is provided at its inner end with a head 21 and at its outer end with a roller 22. Normally the heads 21 of the pawls 20 are within the pockets 19 provided for the pawls, while the roller ends 22 of the pawls extend out from the said pockets, so that when the wheels are turned in direction of the ends of the members $c^2$ and $c^3$ of the frame C the rollers 22 will engage with the concaved or inclined inner faces of the said end members $c^2$ and $c^3$ and cause the heads 21 of the pawls to be carried out from the said pockets 19. Actuating-arms E are used in connection with each wheel D. These actuating-arms are provided with bifurcated lower ends 23, which span the wheels D and are pivoted upon the pivots 24, on which the said wheels D turn, the lower ends of the actuating-arms E being within the frame C, as is clearly shown in Fig. 5. At the upper portion of each actuating-arm E a longitudinal slot $24^a$ is produced, and an actuating-bar 25 is passed through the slots $24^a$ of the actuating-arms E, being provided at its ends with loops or with links 26. The said actuating-bar 25 is pivotally connected with each actuating-arm E by means of suitable pivot-pins 27. The links 26 are adapted to be connected with chains, ropes, or cables, which are led from the gate-supporting frame at the front and at the rear over suitable pulleys carried by posts, as is customary in the construction of gates of this character. Lugs 28 extend out from opposite sides of the wheels D, which lugs engage with the outer vertical or longitudinal edges of the actuating-arms E, as is shown in Figs. 5 and 7. Preferably the portions of the wheels D adjacent to the inner ends of the pockets 19 are more or less chamfered, as is shown at 29 in Figs. 5 and 6, and at each side of each wheel D at its periphery a series of teeth 30 is produced, which teeth extend from the chamfered surfaces 29 as far as may be desired in direction of the outer ends of the end members $c^2$ and $c^3$ of the said frame C, as is also shown in Figs. 5 and 6. At the peripheral portion of each wheel D where the side teeth 30 are produced other and corresponding teeth 31 are formed or are secured or produced in any suitable or approved manner, as is likewise shown in Figs. 5 and 6.

Sectors 32 are mounted by means of suitable pivot-pins 33 in the side members $c$ and $c'$ of the frame C, their curved surfaces facing the sides of the wheels D, as is clearly shown in Figs. 5, 6, and 7. The curved or inner edges of the sectors 32 are beveled and are provided with teeth 34 at each side, the teeth 34 of the sectors being adapted to mesh with the side teeth 30 of the wheels D, while the peripheral teeth 31 of the said wheels are adapted to mesh with each other in the operation of the device. Each sector 32 is provided with an upwardly-extending preferably integral arm 35, and these arms are preferably thinner at their upper ends than where they connect with the sectors, and their inner or opposing edges are more or less concaved. The arm extensions 35 from the sectors 32 extend up into the spaces between the upper curved portions of the inner supporting-uprights 14 of the gates B and B' in such manner that the rollers 16 at the upper ends of these uprights will engage with opposite longitudinal edges of these extensions.

In the operation of the gates, the gates being closed, as shown in Fig. 1, a person upon approaching the gates to open the same will need only to draw outward and downward upon the rope, cord, or chain connected with a link 26 at one end of the connecting-rod 25, whereupon the actuating-arm E adjacent to the link upon which pressure is exerted will be drawn toward the operator and through the medium of the projections 28 on the wheel D in connection with which the said actuating-arm is employed will cause the said wheel to turn, and the wheel in turning will communicate motion to the opposing wheel D, drawing the actuating-arm E belonging to the latter wheel in direction of the first-named actuating-arm, as is shown in Fig. 4, causing the gates to separate, as the wheels D in turning will move the sectors 32 in opposite directions, causing the extensions 35 from the sectors and connected with the gates to force the said gates outward. At this time the pawl 20 carried by the wheel D nearest to the operator will have engaged with the inner curved surface at the end portion of the frame, causing the head 21 of said pawl to be raised upward and to engage with the actuating-arm E nearest the operator at the inner face of the said arm, so that after the operator has passed between the gates by drawing down upon the opposing link 26 o the link at the opposite side of the gate the actuating-arms will be drawn in direction of the operator, and the head 21 of the pawl belonging to the wheel first operated will act as an abutment for the actuating-arm first brought into action and will cause the wheels D to turn in a reverse direction, thus closing the gates by drawing the sectors 32 in direction of each other, and through the medium of the extensions 35 of the said sectors and their connection with the gate-uprights 14 bringing the gates to a closed position, at which time the extensions from the sectors will have the vertical position shown in Fig. 1, and the actuating-arms E will likewise be in vertical or parallel position, as is shown in Fig. 3.

Having thus described my invention, I claim as new and desire to secure by Letters Patent—

1. An actuating mechanism for sliding gates, consisting of a frame, wheels oppositely mounted in the frame, meshing peripheral teeth for the wheels and teeth at the sides of the wheels, pivoted actuating-arms for the wheels, a pivotal connection between the said arms, pawls carried by the wheels, adapted for engagement with the said arms and with the frame, toothed members pivoted in the frame, the teeth carried by said members being adapted for engagement with the side teeth of the wheels, and extensions from the said toothed members, having sliding connection with the gates, for the purpose set forth.

2. An actuating mechanism for sliding gates, consisting of a frame, opposing wheels mounted in the said frame, having engaging peripheral teeth and teeth at their sides, stop-pins extending from opposite sides of the wheels, actuating-arms pivoted on the pivotal supports of the said wheels, straddling the said wheels and extending above them, a rod pivotally connecting the actuating-arms, pawls pivotally mounted in the said wheels, having a head at one end for engagement with the inner faces of the actuating-arms and rollers at their opposite ends, adapted for engagement with the said frame, sectors pivoted likewise in the frame at right angles to the wheels and having teeth which engage with the side teeth of the wheels, and extensions from the said sectors having connection with the gate, for the purpose set forth.

3. The combination with a frame, gates having roller-supports on the frame and capable of movement to and from each other, uprights connected with the gates near their inner ends and extending above the supporting-frame, the upper ends of the said uprights being inclined toward each other, and adjacent rollers mounted to turn in the upper portions of the said uprights, of an auxiliary frame mounted upon the main frame at a point above the line on which the said gates meet in closing, opposing wheels pivoted in the said auxiliary frame, which wheels are provided with peripheral pockets and peripherally-meshing teeth, together with side teeth, actuating-arms pivoted upon the pivotal supports for the wheels, which arms straddle the said wheels and extend above them, a rod pivotally connecting the actuating-arms, pawls pivoted in the pockets of the said wheels, said pawls having heads at their inner ends for engagement with the actuating-arms, the outer ends of the pawls being adapted for engagement with the ends of the said auxiliary frame, sectors pivoted in the auxiliary frame at right angles to the wheels, said sectors having teeth for engagement with the side teeth of both of the wheels, and extensions from the said sectors, which are carried up through the upper curved portions of the uprights from the gates between the friction-rollers carried by said uprights, as described.

4. An actuating mechanism for sliding gates, consisting of opposing pivoted toothed sectors, means for connecting each sector with a gate, toothed wheels meshing with each other and with each sector, actuating-arms for the wheels, stops carried by the wheels for engagement with the arms, and devices for reversing the wheels as specified.

5. An actuating mechanism for sliding gates, consisting of opposing pivoted toothed sectors, means for connecting each sector with a gate, toothed wheels meshing with each other and with the sectors, actuating-arms for the wheels, stops on the wheels for engagement with the said arms, a pivotal connection between the actuating-arms, pawls carried by the wheels for engagement with the arms when moved in one direction, and a trip for the pawls, as set forth.

In testimony whereof I have signed my name to this specification in the presence of two subscribing witnesses.

JOHN GRANGER.

Witnesses:
WILLIAM HOLMES,
MATAMORE G. KEENAN.